United States Patent
Matsuzaki et al.

(10) Patent No.: US 8,189,322 B2
(45) Date of Patent: May 29, 2012

(54) SOLID ELECTROLYTIC CAPACITOR

(75) Inventors: Kenichiro Matsuzaki, Osaka (JP); Taro Matsuo, Daito (JP); Kiyotaka Ito, Daito (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 332 days.

(21) Appl. No.: 12/563,457

(22) Filed: Sep. 21, 2009

(65) Prior Publication Data
US 2010/0073849 A1 Mar. 25, 2010

(30) Foreign Application Priority Data

Sep. 22, 2008 (JP) .................. 2008-242474

(51) Int. Cl.
*H01G 9/00* (2006.01)

(52) U.S. Cl. ........ 361/523; 361/516; 361/517; 361/519; 361/525; 361/528

(58) Field of Classification Search .................. 361/523, 361/516–519, 525–529, 530, 540–541
See application file for complete search history.

(56) References Cited

U.S. PATENT DOCUMENTS

| | | | | |
|---|---|---|---|---|
| 6,215,651 B1 * | 4/2001 | Takada et al. | ................. | 361/523 |
| 6,224,639 B1 * | 5/2001 | Hamada et al. | ............... | 29/25.03 |
| 6,515,848 B1 * | 2/2003 | Yoshida et al. | ............... | 361/525 |
| 7,760,489 B2 * | 7/2010 | Fujita et al. | ................... | 361/528 |

FOREIGN PATENT DOCUMENTS

JP  2001-006977 A  1/2001

* cited by examiner

*Primary Examiner* — Nguyen T Ha
(74) *Attorney, Agent, or Firm* — Westerman, Hattori, Daniels & Adrian, LLP

(57) ABSTRACT

The solid electrolytic capacitor according to the present invention comprises a capacitor element including an anode section, a cathode section, and a dielectric oxide film provided between the anode section and the cathode section. The solid electrolytic capacitor further comprises an anode lead frame connected to the anode section, a cathode lead frame connected to the cathode section, and an exterior resin covering the capacitor element and a part of the anode lead frame and cathode lead frame respectively. The anode section comprises an anode body including a sintered body of a valve action metal, and an average particle diameter of particles of the valve action metal of the anode body is 0.43 μm or smaller.

4 Claims, 8 Drawing Sheets

SOLID ELECTROLYTIC CAPACITOR

The application Number 2008-242474, upon which this patent application is based, is hereby incorporated by reference.

BACKGROUND OF THE INVENTION

1. Field of the Invention

The present invention relates to solid electrolytic capacitors.

2. Description of Related Art

FIG. 9 is a cross-sectional view of a conventional solid electrolytic capacitor 1. The solid electrolytic capacitor 1 comprises a capacitor element 7 covered by an exterior resin 11, and the solid electrolytic capacitor 1 also comprises on its lower surface an anode lead frame 8 and a cathode lead frame 9 as external electrodes.

An anode body 2 is a sintered body of a valve action metal. On a peripheral surface of the anode body 2, sequentially formed are a dielectric oxide film 3, a cathode layer 4, and a cathode lead-out layer 5, and an anode lead 6 made of a valve action metal having a cylindrical form, quadrangular prism form or the like projects from a generally central part of the anode body 2 in the height direction to form the capacitor element 7. The valve action metal is a metal on which an extremely dense and durable dielectric oxide film is formed by electrolytic oxidation process, including tantalum, niobium, aluminum, titanium and the like.

A lower end surface of the anode lead 6 and an upper surface of the anode lead frame 8 have different heights, and therefore, the anode lead 6 and the anode lead frame 8 are electrically connected to each other via a pillow member 10 having a cylindrical form, quadrangular prism form or the like by, for example, laser welding.

Nowadays, downsizing and weight saving of electronic devices such as a computer, portable phone, digital camera and the like is advanced, and also advanced is downsizing and weight saving of solid electrolytic capacitors to be built in such electronic devices. Specifically, the form of the anode lead is shifted from the cylindrical form to the quadrangular prism form to lower the profile of the anode lead, thereby lowering the profile of the solid electrolytic capacitor.

FIG. 10 shows an anode section 12. The anode section 12 is formed by vacuum sintering of a compact of valve action metal powder and the anode lead 6 a predetermined part of which is embedded in the compact. The anode section 12 consists of the anode lead 6 and the anode body 2 which became a sintered body of the valve action metal.

FIGS. 11a and 11b are a top view and a front view of the anode section 12 after being sintered respectively. It is problematic because, as shown in FIG. 11a, a crack 30 occurs on a planting surface 22 of the anode body 2 in which the anode lead 6 is planted, and the crack 30 spreads from a boundary between the planting surface 22 and the anode lead 6, particularly adjacent to a corner part of the quadrangular prism, thereby increasing leakage current.

SUMMARY OF THE INVENTION

In view of above described problem, an object of the present invention is to provide a solid electrolytic capacitor in which no crack occurs on the anode body, so that it is possible to prevent an increase in leakage current.

As the results of intensive studies, the inventors of the present invention found that in the case where the bulk density of the powder is controlled and thereby the average particle diameter of the vacuum sintered anode body is within a predetermined range in manufacturing the compact of the valve action metal such as tantalum, occurrence of the crack decreases and the leakage current improves.

A solid electrolytic capacitor according to a first aspect of the present invention comprises a capacitor element including an anode section, a cathode section, and a dielectric oxide film provided between the anode section and the cathode section. The solid electrolytic capacitor further comprises an anode lead frame connected to the anode section, a cathode lead frame connected to the cathode section, and an exterior resin covering the capacitor element and a part of the anode lead frame and cathode lead frame respectively. The anode section comprises an anode body including a sintered body of a valve action metal, and an average particle diameter of particles of the valve action metal of the anode body is 0.43 μm or smaller.

A solid electrolytic capacitor according to a second aspect of the present invention is the solid electrolytic capacitor of the first aspect described above wherein the anode section comprises an anode lead made of a valve action metal, and a length Wa in the longitudinal direction of a lateral cross-section of the anode lead and a length Wb of the anode body in the longitudinal direction of the lateral cross-section of the anode lead have a relation of Wa/Wb≦0.50.

A solid electrolytic capacitor according to a third aspect of the present invention is the solid electrolytic capacitor of the first or second aspect described above wherein an outer periphery of the lateral cross-section of the anode lead has a track-like form or a form having four straight line parts and curved line parts connecting the straight line parts.

A solid electrolytic capacitor according to a fourth aspect of the present invention is the solid electrolytic capacitor of any one of the first to third aspects described above wherein the valve action metal is tantalum.

As described above, according to the solid electrolytic capacitor of the present invention, a crack does not occur on the anode body and it is possible to prevent an increase in leakage current.

DETAILED DESCRIPTION OF THE PREFERRED EMBODIMENT

Figure 1:
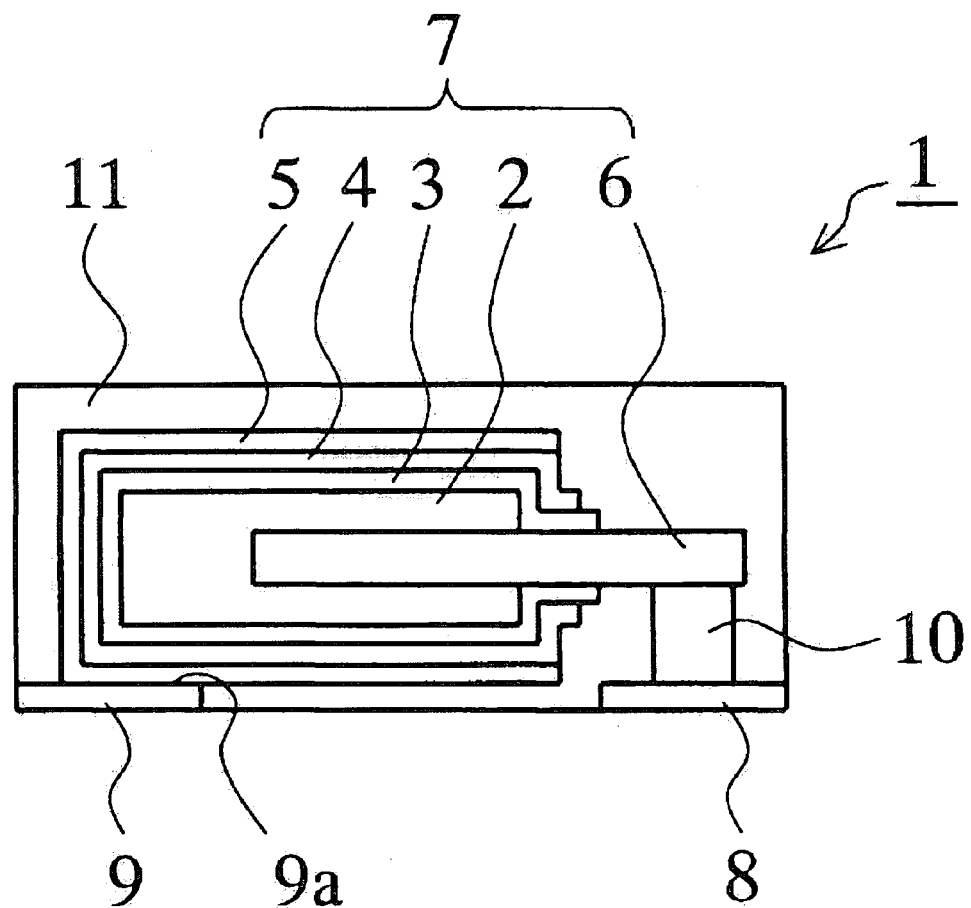
FIG. 1 is a cross-sectional view of a solid electrolytic capacitor according to an embodiment of the present invention.

FIG. 1 is a cross-sectional view of a solid electrolytic capacitor 1 according to an embodiment of the present invention.

First, an unsintered anode section to become an anode section by vacuum sintering is prepared in a following procedure. An anode lead is disposed at a predetermined relative position to a die cavity. And then, valve action metal powder having a bulk density within a predetermined range is poured into the cavity and pressed to complete the unsintered anode section consisting of a compact in which the anode lead is planted.

Figure 2:
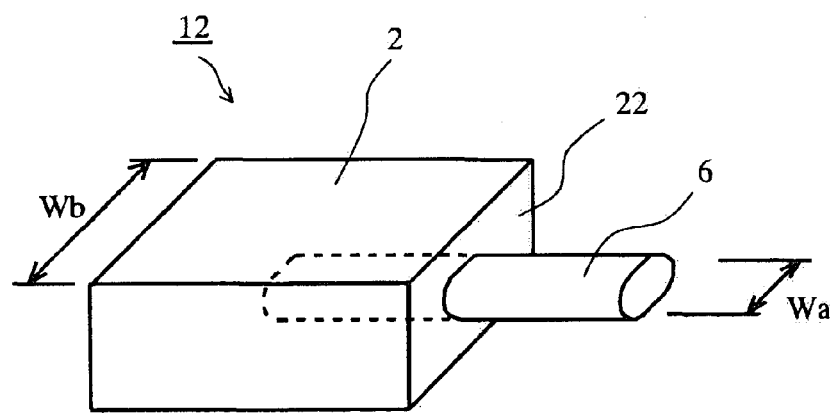
FIG. 2 is a perspective view of an anode section according to the embodiment of the present invention.

Next, the unsintered anode section is vacuum sintered to complete the anode section 12 comprising an anode body 2 and an anode lead 6 as shown in FIG. 2. Then, on a peripheral surface of the anode body 2, sequentially formed are a dielectric oxide film 3, a cathode layer 4, and a cathode lead-out layer 5, to complete a capacitor element 7.

Thereafter, conductive paste (not shown) as an adhesive agent is applied to a cathode lead frame part 9a, and the capacitor element 7 is disposed at a predetermined position on the cathode lead frame part 9a. Further, the anode lead 6 disposed on an upper surface of a pillow member 10 having a quadrangular prism form is fixed to the pillow member 10 by a laser welding.

And then, the capacitor element 7 is covered by an exterior resin 11 using a known method such as transfer mold to prepare a covered body which is a covered capacitor element 7. And then, the covered body is cut at a predetermined position to complete the solid electrolytic capacitor 1.

[Method of Measuring Average Particle Diameter]

A method of measuring the average particle diameter of the anode body is explained below.

Figure 3A:
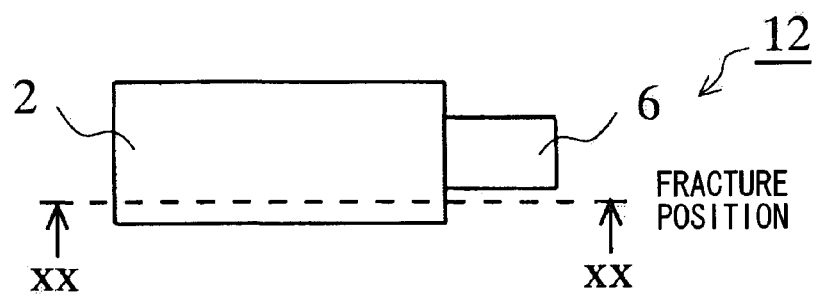
FIGS. 3a to 3c are views explaining a measuring method of an average particle diameter of an anode body.
Figure 3B:
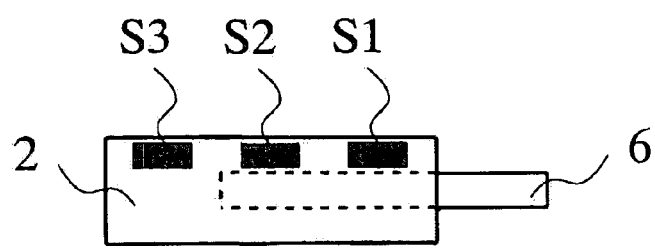

Scanning electron microscope S-4500, a product of Hitachi, Ltd., was used as a measuring device, and an image processing system PCI, a product of Hitachi High-Tech Fielding Corporation, was used as a length measuring software. FIG. 3a is a view of the anode section 12 prepared as a sample, taken from a direction perpendicular to a mounting surface of a solid electrolytic capacitor. First, the anode body 2 was fractured on the left side of the anode lead 6 as shown in FIG. 3a. FIG. 3b is a view of the fractured surface taken from an xx-xx direction. As shown in FIG. 3b, measured was the average particle diameter of three fields (right side part S1, central part S2, and left side part S3) of one sample.

Figure 3C:
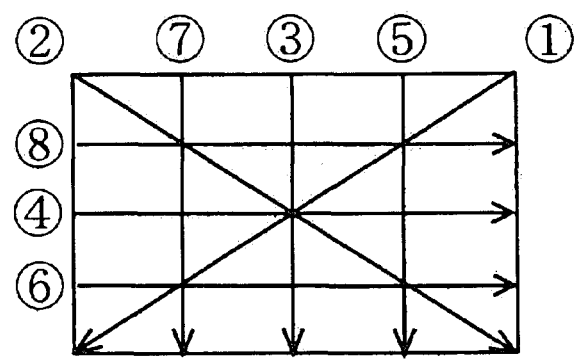

In particular, in each field, a line was drawn on the fractured surface magnified 10000 times on a display of the scanning electron microscope, and measured was a maximum outer diameter of valve action metal particle having a clear contour among the valve action metal particles crossing the line. Line drawing was performed in the order indicated by numbers in FIG. 3c and measuring was continued until the number of measured particles becomes 20. And then, data of the greatest two and the smallest two particles was eliminated from the measured data of the 20 particles, and an average value of the data of remaining 16 particles was calculated to obtain the average particle diameter of one field. Finally, the average value of the average particle diameters of the three fields was considered to be the average particle diameter of the sample. The magnification ratio of the observation was set to 1:10000 because more than 200 particles can be sufficiently observed in one field with this ratio on the display.

[First Embodiment]

Figure 4A:
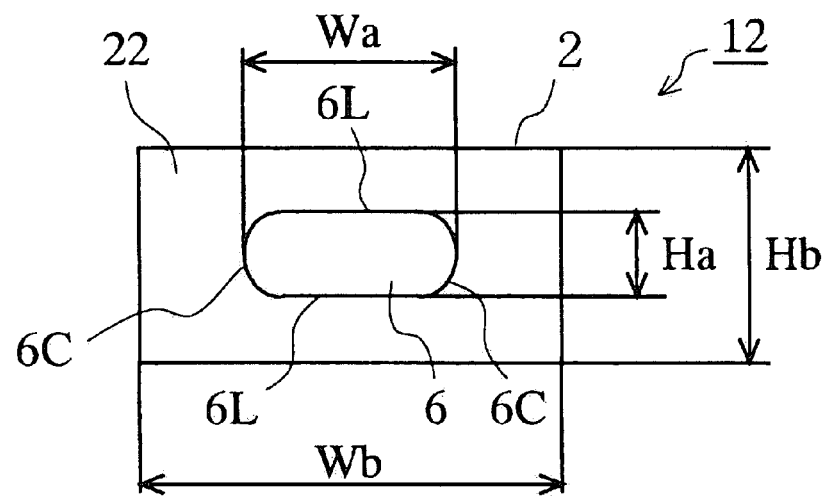
FIGS. 4a and 4b are views explaining a form of the anode section according to the embodiment of the present invention.

FIG. 4a is a view of the anode section 12 of a first embodiment taken from a planting surface 22 side. The anode lead 6 is planted in the planting surface 22 of the anode body 2. The anode body 2 having a quadrangular prism form is formed by vacuum sintering of tantalum powder which is a valve action metal, and the average particle diameter of sintered tantalum particles is 0.40 μm. Also, the anode lead 6 is a quadrangular prism form body made of tantalum, a lateral cross-section of which has a track-like form of athletic sports with an outer periphery including two straight line parts 6L and two curved line parts 6C coupling the straight line parts as shown in FIG. 4a.

A length Wa (a width of the anode lead) in the longitudinal direction of the lateral cross-section of the anode lead 6 is 1.4 mm, and a length Ha in the lateral direction thereof is 0.3 mm. A length Wb (a width of the anode body) of the anode body 2 in the longitudinal direction of the lateral cross-section of the anode lead 6 is 3.2 mm, and a length Hb of the anode body 2 in the lateral direction of the lateral cross-section of the anode lead 6 is 1.0 mm. Thus, a ratio wa/wb is 0.44. The length Wa in the longitudinal direction of the lateral cross-section of the anode lead 6 is a length between vertexes of the two curved line parts 6C which form an outer periphery of the lateral cross-section, i.e. the maximum length in the longitudinal direction.

Thereafter, the solid electrolytic capacitor 1 is completed in the procedure described above.

[Second and Third Embodiments]

In second and third embodiments, the bulk density of the tantalum powder is different from that in the first embodiment, as the only change from the first embodiment. Specifically, the average particle diameters of the tantalum particles of the anode body 2 are 0.34 μm and 0.28 μm respectively.

[Fourth to Sixth Embodiments]

In fourth, fifth, and sixth embodiments, the lengths Wa in the longitudinal direction of the lateral cross-section of the anode lead 6 are 1.0, 1.2, and 1.8 mm respectively, and this is the only change from the first embodiment. In other words, as the only change from the first embodiment, the ratios wa/wb in the fourth, fifth, and sixth embodiments are 0.31, 0.38, and 0.56 respectively.

FIRST AND SECOND COMPARATIVE EXAMPLES

In first and second comparative examples, the bulk density of the tantalum powder is different from that in the first embodiment, as the only change from the first embodiment. Specifically, the average particle diameters of the tantalum particles of the anode body 2 are 0.47 μm and 0.53 μm respectively.

[Evaluation Result]

Prepared were 1000 solid electrolytic capacitors according to each of the first to sixth embodiments and the first and second comparative examples. For each sample, the planting surface of the anode section was observed and the occurrence rate of cracks was checked. Also, rated voltage 2.5 V was applied to the completed samples of the solid electrolytic capacitor for two hours and thereafter the leakage current and equivalent series resistance (ESR) were measured. The data was shown in Table 1.

TABLE 1

| | AVERAGE PARTICLE DIAMETER (μm) | WIDTH Wa OF ANODE LEAD (mm) | WIDTH Wb OF ANODE BODY (mm) | Wa/Wb | OCCURRENCE RATE OF CRACKS (%) | LEAKAGE CURRENT (μA) | EQUIVALENT SERIES RESISTANCE (mΩ) |
|---|---|---|---|---|---|---|---|
| FIRST EMBODIMENT | 0.40 | 1.4 | 3.2 | 0.44 | 0.1 | 25.8 | 5.90 |
| SECOND EMBODIMENT | 0.34 | 1.4 | 3.2 | 0.44 | 0.2 | 32.1 | 5.88 |
| THIRD EMBODIMENT | 0.28 | 1.4 | 3.2 | 0.44 | 0.2 | 30.4 | 5.70 |
| FOURTH EMBODIMENT | 0.40 | 1.0 | 3.2 | 0.31 | 0 | 14.1 | 6.52 |
| FIFTH EMBODIMENT | 0.40 | 1.2 | 3.2 | 0.38 | 0.1 | 21.1 | 5.88 |
| SIXTH EMBODIMENT | 0.40 | 1.8 | 3.2 | 0.56 | 0.4 | 72.3 | 5.85 |
| FIRST COMPARATIVE EXAMPLE | 0.47 | 1.4 | 3.2 | 0.44 | 0.5 | 85.2 | 5.92 |
| SECOND COMPARATIVE EXAMPLE | 0.53 | 1.4 | 3.2 | 0.44 | 0.6 | 90.1 | 5.94 |

Figure 5:
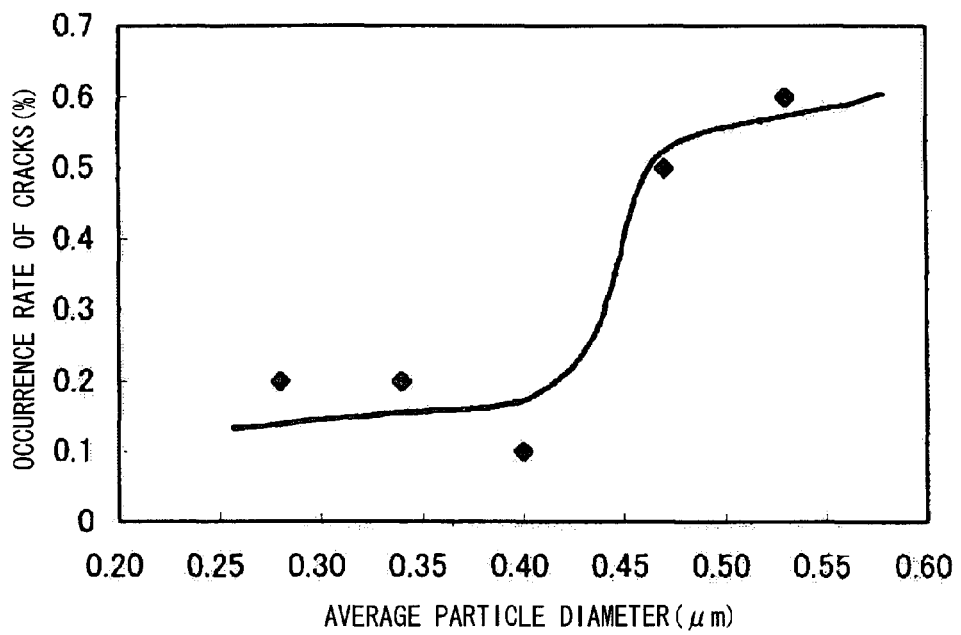
FIG. 5 is a view describing a relation between the average particle diameter and occurrence rate of cracks.
Figure 6:
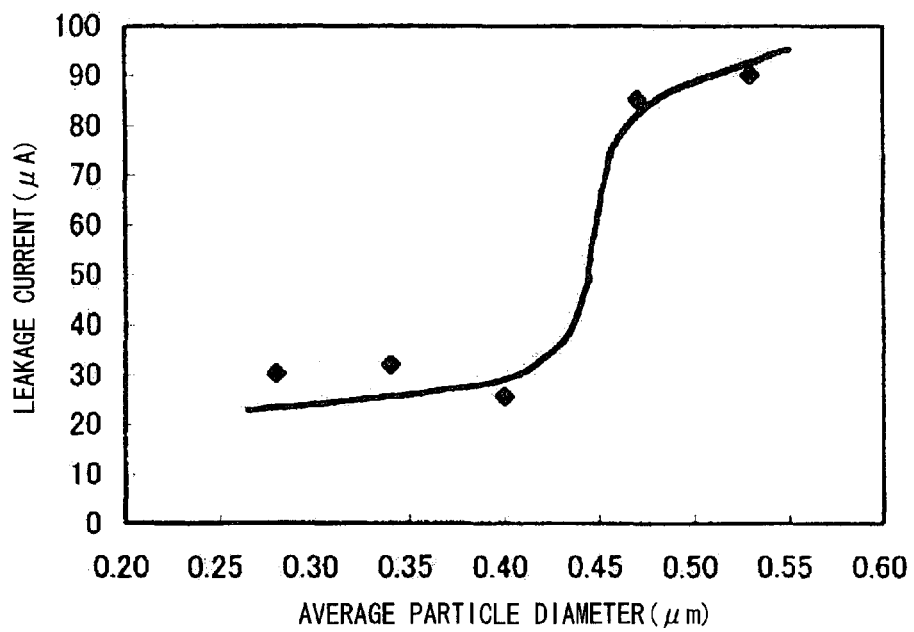
FIG. 6 is a view describing a relation between the average particle diameter and leakage current.

In any of the first to third embodiments and the first and second comparative examples, the ratio wa/wb is 0.44. The occurrence rates of cracks are 0.5, 0.6% in the first and second comparative examples respectively, but are lower values of 0.1 to 0.2% in the first to third embodiments. The leakage currents are 85.2, 90.1 μA in the first and second comparative examples, but are lower values of 25.8 to 30.4 μA in the first to third embodiments. As to the equivalent series resistance, there is no significant difference in the first to third embodiments and the first and second comparative examples. A relation between the average particle diameter and the occurrence rate of cracks is shown in FIG. 5, and a relation between the average particle diameter and the leakage current is shown in FIG. 6. From FIGS. 5 and 6, it can be found that the occurrence rate of cracks and the leakage current improve in the case where the average particle diameter is 0.43 μm or smaller.

In any of the first, fourth to sixth embodiments, the average particle diameter of the tantalum particles of the anode body is 0.40 μm. The occurrence rates of cracks are 0 to 0.1% in the first, fourth and fifth embodiments, and higher value of 0.4% in the sixth embodiment. However, the occurrence rates of cracks of the embodiments are lower than those in the first and second comparative examples, in which the rates are 0.5, 0.6%. The leakage current is 25.8 μA in the first embodiment, but improves to 14.1, 21.1 μA in the fourth and fifth embodiments, in which the ratios wa/wb are smaller than that in the first embodiment. The leakage current is deteriorated to 72.3 μA in the sixth embodiment in which Wa/Wb is greater than that in the first embodiment. However, the leakage current standard for this model is 80 μA or smaller, and therefore, the solid electrolytic capacitor according to the sixth embodiment is non-defective product. The equivalent series resistance has a tendency of being greater as the width Wa of the anode lead is smaller. However, the equivalent series resistance is 5.85 to 6.52 mΩ, which is not at a problematic level.

Figure 7:
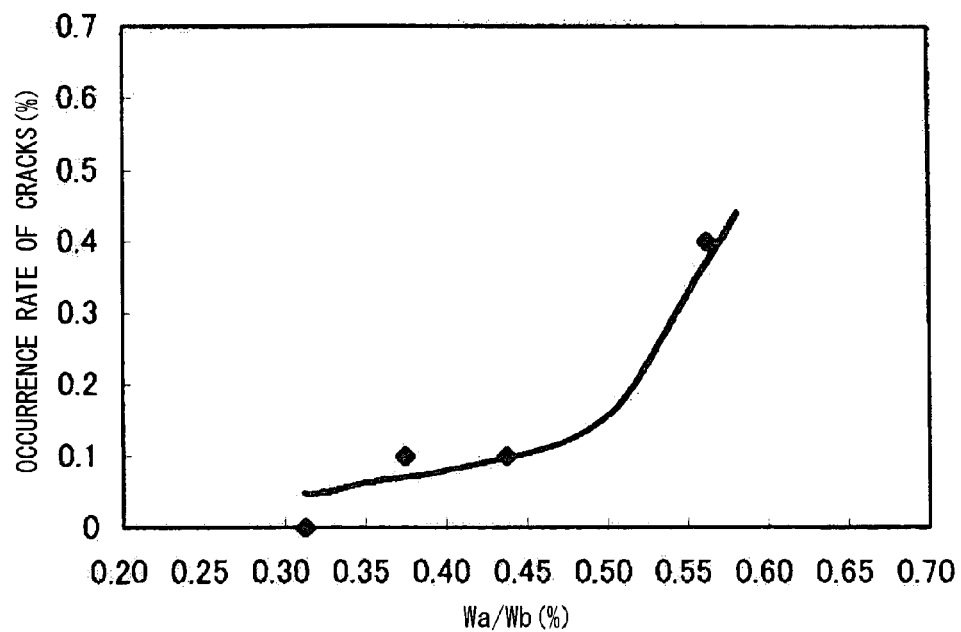
FIG. 7 is a view describing a relation between a ratio wa/wb and the occurrence rate of cracks.
Figure 8:
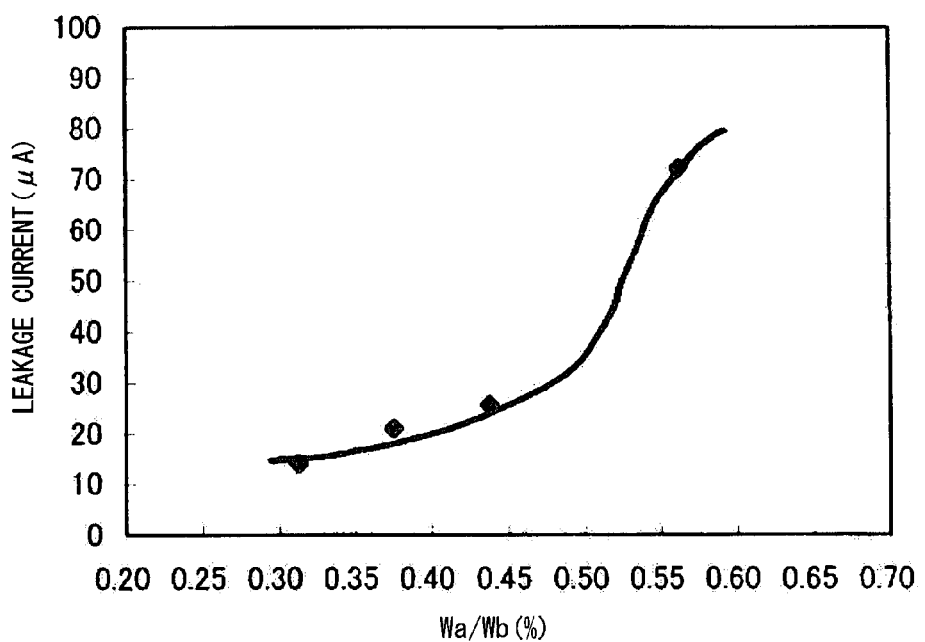
FIG. 8 is a view describing a relation between the ratio Wa/Wb and the leakage current.
Figure 9:
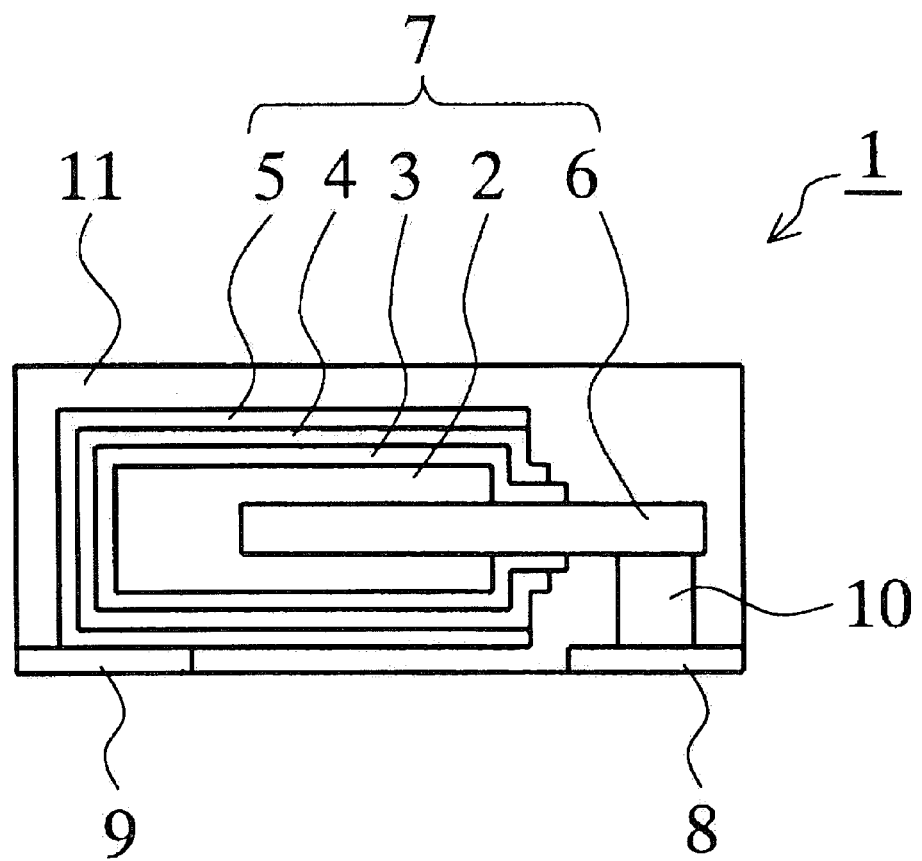
FIG. 9 is a cross-sectional view of a conventional solid electrolytic capacitor.
Figure 10:
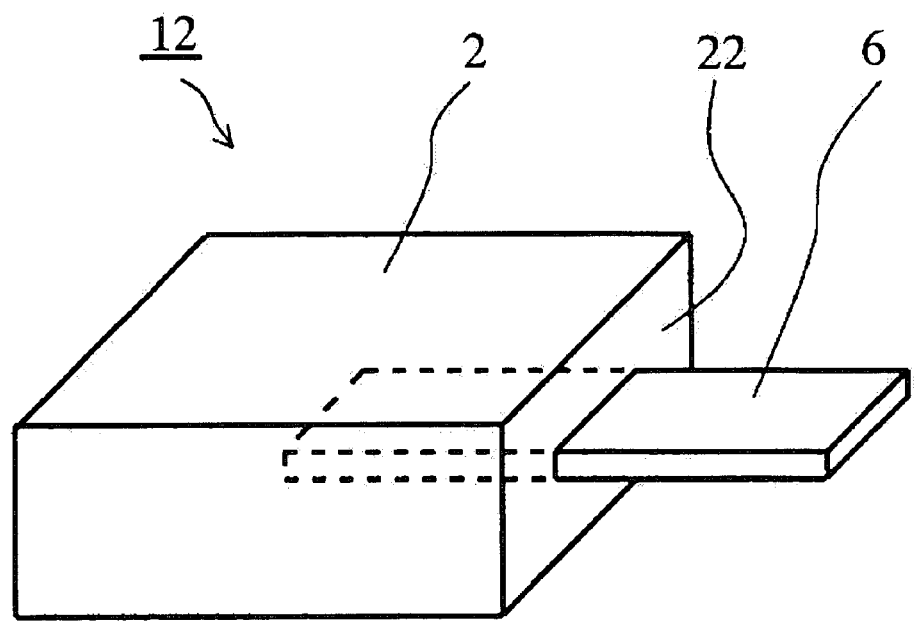
FIG. 10 is a perspective view of the conventional anode section.
Figure 11A:
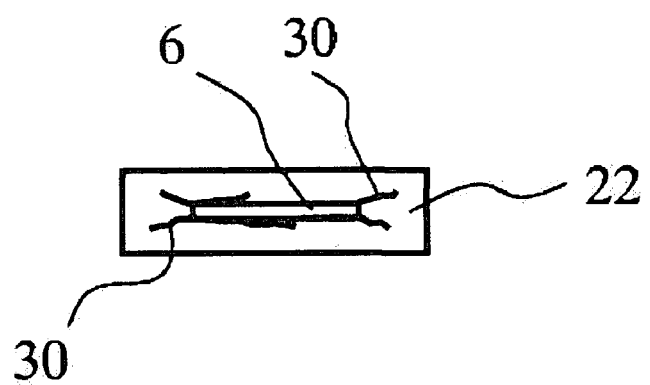
FIGS. 11a and 11b are views explaining the occurrence of the crack on the conventional anode section.
Figure 11B:
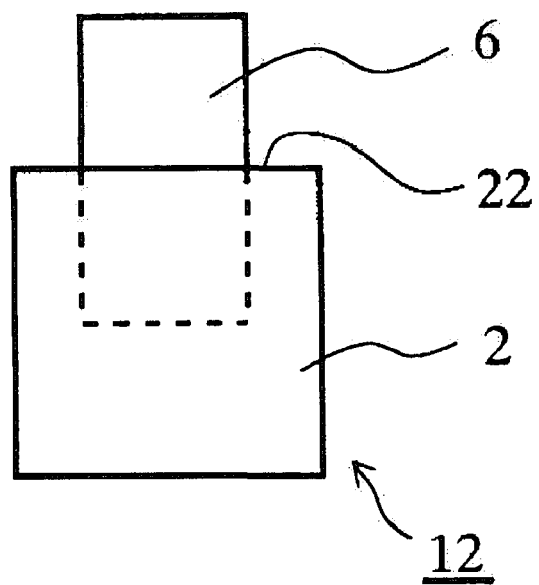

A relation between the ratio Wa/Wb and the occurrence rate of cracks is shown in FIG. 7, and a relation between the ratio Wa/Wb and the leakage current is shown in FIG. 8. It can be found from FIG. 7 that the occurrence rate of cracks can be suppressed to low value of 0 to 0.2% in the case where the ratio Wa/Wb is 0.50 or smaller. Also, it can be found from FIG. 8 that the leakage current can be suppressed to around 35 or smaller in the case where the ratio Wa/Wb is 0.50 or smaller.

Although tantalum is adopted as the valve action metal in the embodiments, the valve action metal is not limited to that, and it is also possible to adopt, for example, niobium, titanium, and aluminum to obtain the same effect. The dimensions of the anode body 2 and the anode lead 6 are also only examples, and the dimensions are not limited to those.

Figure 4B:
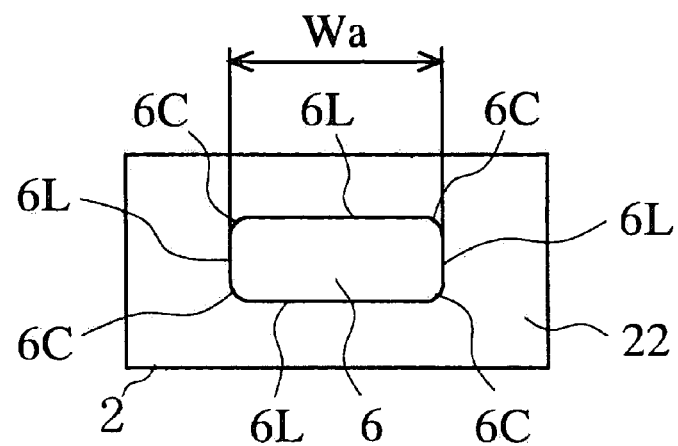

The lateral cross-section surface of the anode lead used in the embodiment has a track-like form. However, the form is not limited to this. For example, it is possible to adopt a form such that the lateral cross-section surface an outer periphery of which has four straight line parts 6L and curved line parts 6C connecting the straight line parts 6L as shown in FIG. 4b.

Further, the anode lead frame 8 and the cathode lead frame 9 used in the embodiments are so-called lower surface electrode type. However, it is appreciated that this is not a limitation, and, for example, a gullwing type (in which the anode lead frame and the cathode lead frame are exposed from the exterior resin and extend along a side surface and lower surface of the solid electrolytic capacitor) may be adopted.

The embodiments disclosed herein are exemplification and do not limit the invention to the illustrated embodiments. The present invention is described by claims, not the range described above, and is intended to include all alternations within the scope defined by claims and equivalent.

What is claimed is:
1. A solid electrolytic capacitor comprising:
 a capacitor element including an anode section, a cathode section, and a dielectric oxide film provided between the anode section and the cathode section;
 an anode lead frame connected to the anode section;
 a cathode lead frame connected to the cathode section; and
 an exterior resin covering the capacitor element and a part of the anode lead frame and cathode lead frame respectively,
 wherein the anode section comprises an anode body including a sintered body of a valve action metal, and an average particle diameter of particles of the valve action metal of the anode body is 0.43 μm or smaller,
 wherein the anode section comprises an anode lead made of a valve action metal, and a length Wa in the longitudinal direction of a lateral cross-section of the anode lead and a length Wb of the anode body in the longitudinal direction of the lateral cross-section of the anode lead have a relation of Wa/Wb≦0.50.

2. The solid electrolytic capacitor according to claim 1, wherein the valve action metal of the anode body is tantalum.

3. The solid electrolytic capacitor comprising:

a capacitor element including an anode section, a cathode section, and a dielectric oxide film provided between the anode section and the cathode section;

an anode lead frame connected to the anode section;

a cathode lead frame connected to the cathode section; and an exterior resin covering the capacitor element and a part of the anode lead frame and cathode lead frame respectively, wherein the anode section comprises an anode body including a sintered body of a valve action metal, and an average particle diameter of particles of the valve action metal of the anode body is 0.43 μm or smaller, wherein the anode section comprises an anode lead made of a valve action metal, and an outer periphery of a lateral cross-section of the anode lead has a track-like form or a form having four straight line parts and curved line parts connecting the straight line parts.

4. The solid electrolytic capacitor according to claim 3, wherein the valve action metal of the anode body is tantalum.

* * * * *